United States Patent
Dain et al.

(10) Patent No.: US 10,956,273 B2
(45) Date of Patent: Mar. 23, 2021

(54) APPLICATION AWARE EXPORT TO OBJECT STORAGE OF LOW-REFERENCE DATA IN DEDUPLICATION REPOSITORIES

(71) Applicant: INTERNATIONAL BUSINESS MACHINES CORPORATION, Armonk, NY (US)

(72) Inventors: Joseph W. Dain, Vail, AZ (US); Gregory T. Kishi, Oro Valley, AZ (US); Gil E. Paz, Yehud (IL); Renan Jeshua Ugalde Amezcua, Guadalajara (MX)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 736 days.

(21) Appl. No.: 15/082,222

(22) Filed: Mar. 28, 2016

(65) Prior Publication Data
US 2017/0277598 A1 Sep. 28, 2017

(51) Int. Cl.
*G06F 11/14* (2006.01)
*G06F 16/174* (2019.01)

(52) U.S. Cl.
CPC ...... *G06F 11/1453* (2013.01); *G06F 11/1451* (2013.01); *G06F 16/1748* (2019.01)

(58) Field of Classification Search
CPC ........... G06F 17/30156; G06F 16/1748; G06F 11/1453
See application file for complete search history.

(56) References Cited

U.S. PATENT DOCUMENTS

| | | | |
|---|---|---|---|
| 9,122,642 B2 | 9/2015 | Chavda et al. | |
| 9,128,948 B1 | 9/2015 | Raorane | |
| 2008/0243769 A1 | 10/2008 | Arbour et al. | |
| 2010/0333116 A1 | 12/2010 | Prahlad | |
| 2011/0010498 A1* | 1/2011 | Lay | G06F 11/1453 711/115 |
| 2011/0167221 A1* | 7/2011 | Pangal | G06F 11/1453 711/117 |
| 2012/0158670 A1 | 6/2012 | Sharma et al. | |
| 2013/0173627 A1* | 7/2013 | Apte | G06F 17/30156 707/741 |
| 2013/0326115 A1 | 12/2013 | Goss | |
| 2013/0326159 A1 | 12/2013 | Vijayan et al. | |
| 2014/0006354 A1* | 1/2014 | Parkison | G06F 3/0611 707/649 |
| 2014/0006357 A1 | 1/2014 | Davis et al. | |
| 2016/0253339 A1 | 9/2016 | Ambrose et al. | |

(Continued)

OTHER PUBLICATIONS

M. Dutch, "Understanding data deduplication ratios", 2008, SNIA. (Year: 2008).*

(Continued)

*Primary Examiner* — Sheryl L Holland
(74) *Attorney, Agent, or Firm* — Griffiths & Seaton PLLC

(57) ABSTRACT

Various embodiments for managing data in a data deduplication repository in a computing storage environment, by a processor device, are provided. In one embodiment, a method comprises migrating certain deduplication repository data from a host to an object storage by integrating a data offload process with an existing backup management application, for reducing unnecessary deduplication repository data stored on the host.

9 Claims, 6 Drawing Sheets

(56) References Cited

U.S. PATENT DOCUMENTS

2016/0371295 A1* 12/2016 Aronovich ........ G06F 17/30156
2017/0031825 A1    2/2017 Chen et al.

OTHER PUBLICATIONS

List of IBM Patents or Patent Applications Treated as Related dated Mar. 30, 2016 (2 pages).
U.S. Appl. No. 15/082,251, filed Mar. 28, 2016 (38 pages).
M. Dutch, "Understanding data deduplication ratios", Jun. 2008, Storage Networking Industry Association. (Year: 2008).

* cited by examiner

APPLICATION AWARE EXPORT TO OBJECT STORAGE OF LOW-REFERENCE DATA IN DEDUPLICATION REPOSITORIES

CROSS-REFERENCE TO RELATED APPLICATIONS

This Application, listed as docket number TUC920160006US1, is related to Application docket number TUC920160027US1, filed on even date as the present Application, and the contents therein hereby incorporated by reference in their entirety.

BACKGROUND OF THE INVENTION

Field of the Invention

The present invention relates in general computing systems, and more particularly to various embodiments for repository management in data deduplication systems in computing storage environments.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. These computer systems may also include virtual storage components.

Often times when writing to even the smallest environment, single drives, duplicate data is written. These duplicated contents can then be DE-duplicated using standard deduplication techniques so long as specific metrics are met.

SUMMARY OF THE INVENTION

Various embodiments for managing data in a data deduplication repository in a computing storage environment, by a processor device, are provided. In one embodiment, a method comprises migrating certain deduplication repository data from a host to an object storage by integrating a data offload process with an existing backup management application, for reducing unnecessary deduplication repository data stored on the host.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
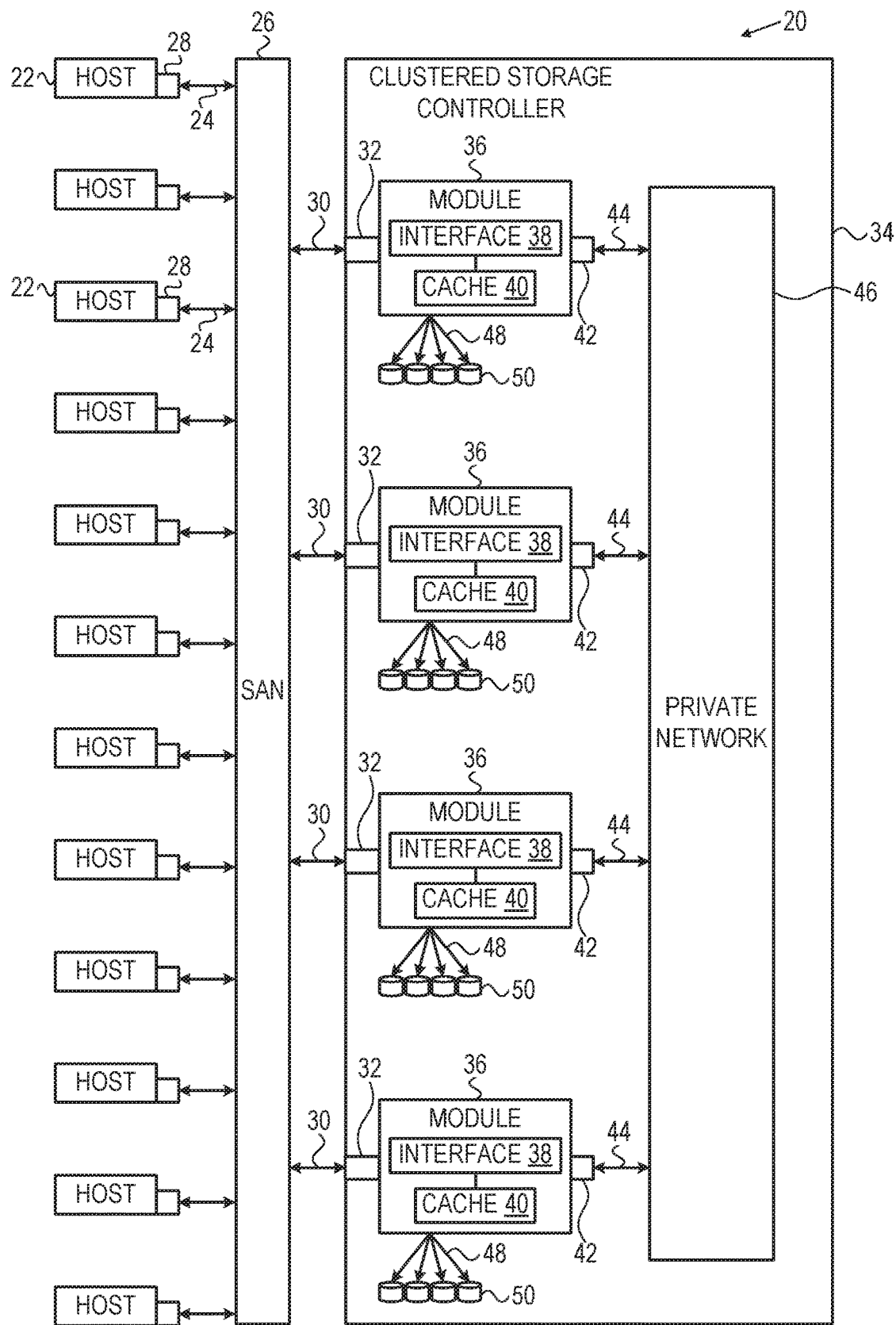
FIG. 1 is a block diagram illustrating a computer storage environment in which aspects of the present invention may be realized.

Described embodiments, and illustrative Figures of various embodiments for managing data in a data deduplication repository in a computing storage environment are to follow. In the interest of clarity, not all features of an actual implementation are described in this Specification. It will of course be appreciated by the skilled artisan, that in the development of any such actual embodiment, numerous implementation-specific decisions must be made to achieve the developers' specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

Data deduplication is a highly important and vibrant field in computing storage systems. Data deduplication refers to the reduction and/or elimination of redundant data. In data deduplication, a data object, which may be a file, a data stream, or some other form of data, is broken down into one or more parts called chunks or blocks. In a data deduplication process, duplicate copies of data are reduced or eliminated, leaving a minimal amount of redundant copies, or a single copy of the data, respectively. The goal of a data deduplication system is to store a single copy of duplicated data, and the challenges in achieving this goal are efficiently finding the duplicate data patterns in a typically large repository, and storing the data patterns in a storage efficient deduplicated form. A significant challenge in deduplication storage systems is scaling to support very large repositories of data. Such large repositories can reach sizes of Petabytes (1 Petabyte=$2^{50}$ bytes) or more. Deduplication storage systems supporting such repository sizes, must provide efficient processing for finding duplicate data patterns within the repositories, where efficiency is measured in resource consumption for achieving deduplication (resources may be CPU cycles, RAM storage, persistent storage, networking, etc.).

With the continued advancement of computer processors and memory, data storage space has begun to lag behind. While storage space has indeed increased, the demands on the existing space have increased dramatically as well. This increase in demands has resulted in new avenues being explored to better utilize the given storage at hand. Data deduplication is one of those avenues. Modern data deduplication users can achieve 10, sometimes up to 20, (or even greater) times the original storage capacity. In other words, the same user, with the benefit of deduplication technology, essentially has the capacity of ten storage units where the user originally had one, without any additional space or power requirements.

The present Disclosure relates specifically to "hybrid cloud environment" when illustrating the described embodiments. A hybrid cloud environment, as it pertains to the present invention, comprises public and private (on-premise and off-premise) cloud environments being used for company workloads and/or for data storage repositories. In one example, a specific workload, or a data repository may be split between the public, private, and/or on-premise and off-premise cloud. This may include automated or manual shifts of data or workloads between the public, private, and/or on-premise and off-premise cloud. The present invention focuses on backup, restore, and disaster recovery in hybrid cloud environments that leverage data reduction techniques such as deduplication and compression. Typically, in this environment, users back up on-premise data which is either immediately pushed to a cloud (i.e. object storage service provider), or stored locally on-premise and later migrated to the cloud.

During backup in hybrid cloud environments, data reduction techniques such as the aforementioned data deduplication, as well as incremental forever, and compression techniques are enabled to minimize resource consumption. A preferred method is to tier, or move, data in the repository having a low reference count and additionally not from a recent backup to object storage. If a block of data has a high reference count, this means that the data is being referenced by many virtual entities (virtual cartridges, virtual files, virtual objects, etc.) and is contributing to good overall deduplication repository ratios. Conversely, if a block of data has a low reference count, this means that the data is consuming limited space in the deduplication repository and negatively contributing to the overall deduplication ratio. In one case, it may make sense to off-load, or migrate, this low referenced data to object storage. On the other hand, it may make sense to wait for a period of time before off-loading these data blocks to object storage in order to optimize restore and disaster recovery, should the user need to perform this task. Otherwise, the data needed to restore to the time nearest to production may entail recalling data from object storage off-premise which may have long latency and limited bandwidth.

In addition, in certain scenarios it is optimal to have the backup application aware of the location of the backup data being held in the local deduplication repository or in an object store.

In view of the foregoing, the mechanisms of the illustrated embodiments provide various solutions to migrating certain repository data to an object storage. These mechanisms include such functionality as tightly integrating an offloading process with an existing backup management application, as will be further described.

The mechanisms may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios as noted above.

Turning now to FIG. 1, a schematic pictorial illustration of a data processing storage subsystem 20 is shown, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
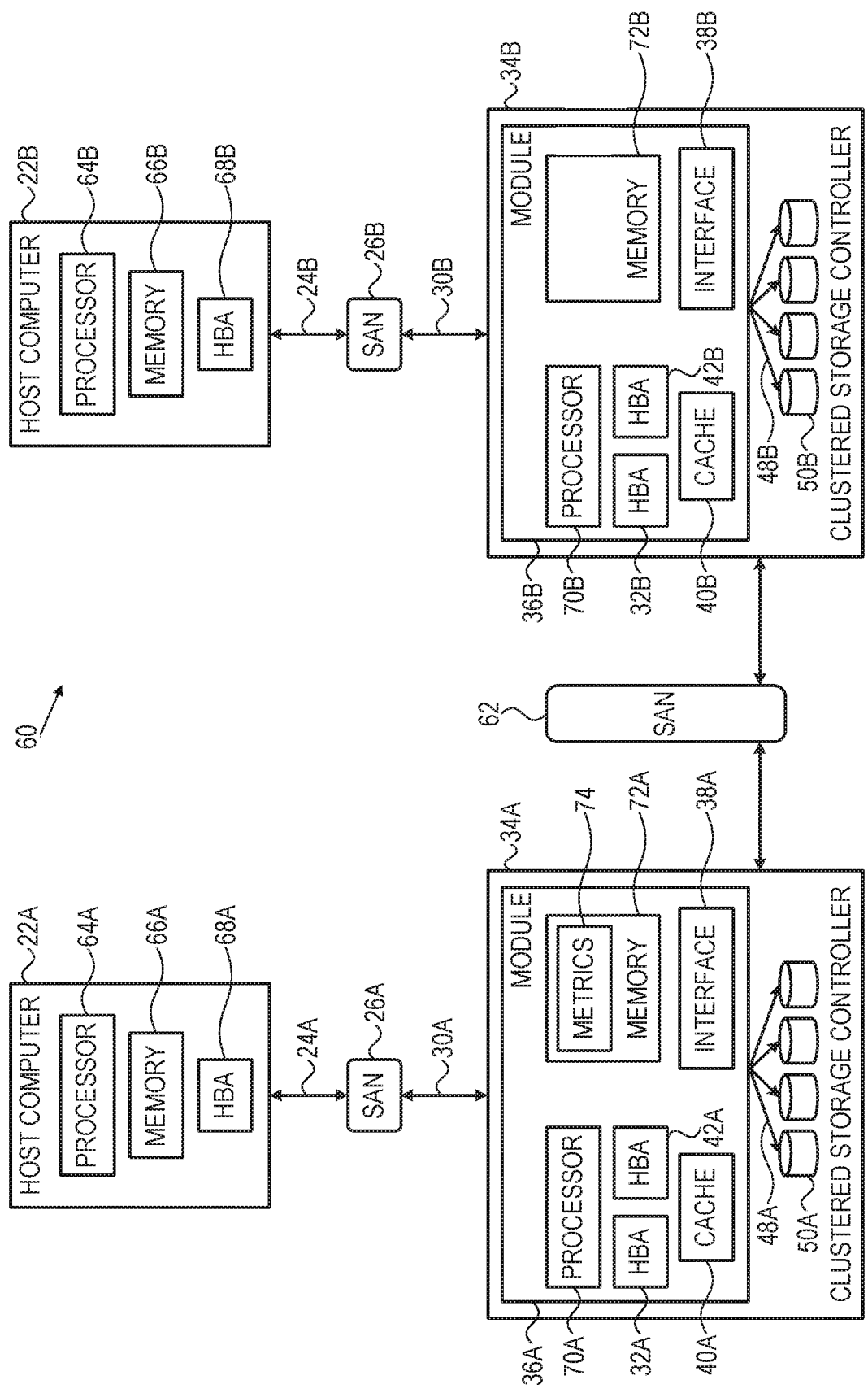
FIG. 2 is a block diagram illustrating a hardware structure of an exemplary data storage system in a computer system in which aspects of the present invention may be realized.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 60 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2 storage controllers 34A and 34B are coupled via a facility SAN 62.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A. Module 36A also comprises a processor 70A and a memory 72A. As explained in detail hereinbelow, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70A and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (iSCSI) adapters, Fibre Channel over Ethernet (FCoE) adapters, serial attached SCSI (SAS), and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

Figure 3:
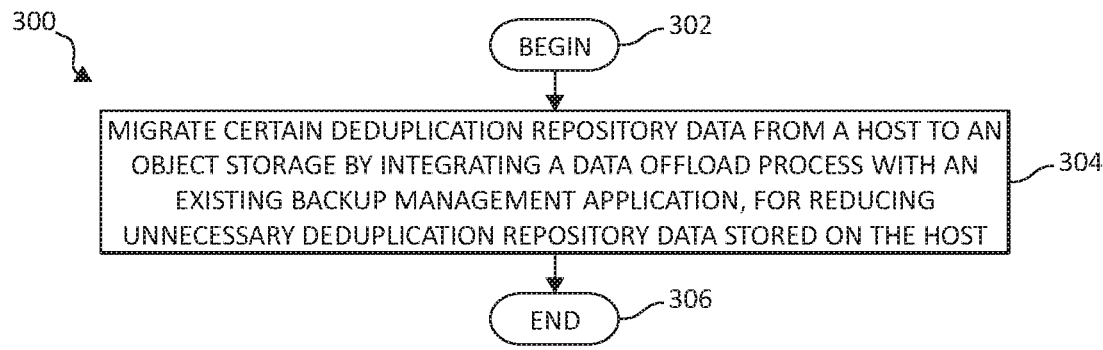
FIG. 3 is a flow chart illustrating a method for managing data in a data deduplication repository in accordance with aspects of the present invention.

Continuing to FIG. 3, a method 300 for managing data in a data deduplication repository in a computing storage environment, is illustrated, in accordance with one embodiment of the present invention. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Beginning at step 302, certain deduplication repository data is migrated from a host to an object storage by integrating a data offload process with an existing backup management application. This process reduces unnecessary deduplication repository data stored on the host (step 304). The method ends (step 306).

The present invention provides application aware migration of host repository data to object storage by tightly integrating an offloading process with an existing backup management application. The techniques described herein integrate seamlessly with existing backup applications using application programming interface (API) commands that enable existing backup management applications to develop new function to manage the hybrid cloud environment.

In one embodiment, an existing backup management application is able to issue an API to a cloud deduplicating gateway (e.g. an IBM® ProtecTIER™ deduplicating gateway) to identify repository data via virtual entities (e.g. virtual cartridges, virtual files, virtual images) which are candidates for offloading to object storage. The deduplicating cloud gateway may then return the list of candidates for offload. Alternatively, the deduplicating gateway may automatically offload the identified entities to object storage and transmit a return status to the application.

The offload process is aligned with an existing design paradigm for a given host interface, such as a virtual tape library (VTL), file system interface (NFS/CIFS/SMB), OpenStorage (OST), and object storage. An inventory and listing of the data migrated to object storage is maintained within the deduplicating gateway, and the backup management application is able to query the listing information via the API.

In various embodiments, a user may specify thresholds for deduplication efficacy that dictate which data will be moved from the host repository to object storage. This may be described as a certain data having a reference count number below a predetermined threshold. Additionally, the user may specify time frame thresholds that dictate which data having a certain age within the system will be moved to object storage. Moreover, the user may "opt-out" of offloading any specific data to object storage, regardless of any other pre-set or predetermined thresholds. Such capability is be desirable to ensure optimal (on-premise) performance for a data set/backup set independent of any other factors. These values within the system may be dynamically adjusted and tuned according to real-time user needs.

In one embodiment, for a VTL interface, the API identifies candidates for offload to object storage at the virtual cartridge level. Virtual cartridges marked for offload are moved to an export slot of the virtual tape library and are then transparently offloaded to object storage. The deduplicating cloud gateway keeps an index of the content in object storage—specifically a mapping between the local repository of the virtual cartridge to objects and containers in the cloud.

In another embodiment, for a file system interface, an inventory and listing of the data tiered to the object storage is maintained within the deduplicating gateway in order to provide application awareness with a set time for how long to keep backups local and set deduplication efficacy thresholds for migrating certain repository data to object storage.

Virtual Entity Candidate Identification

Figure 4:
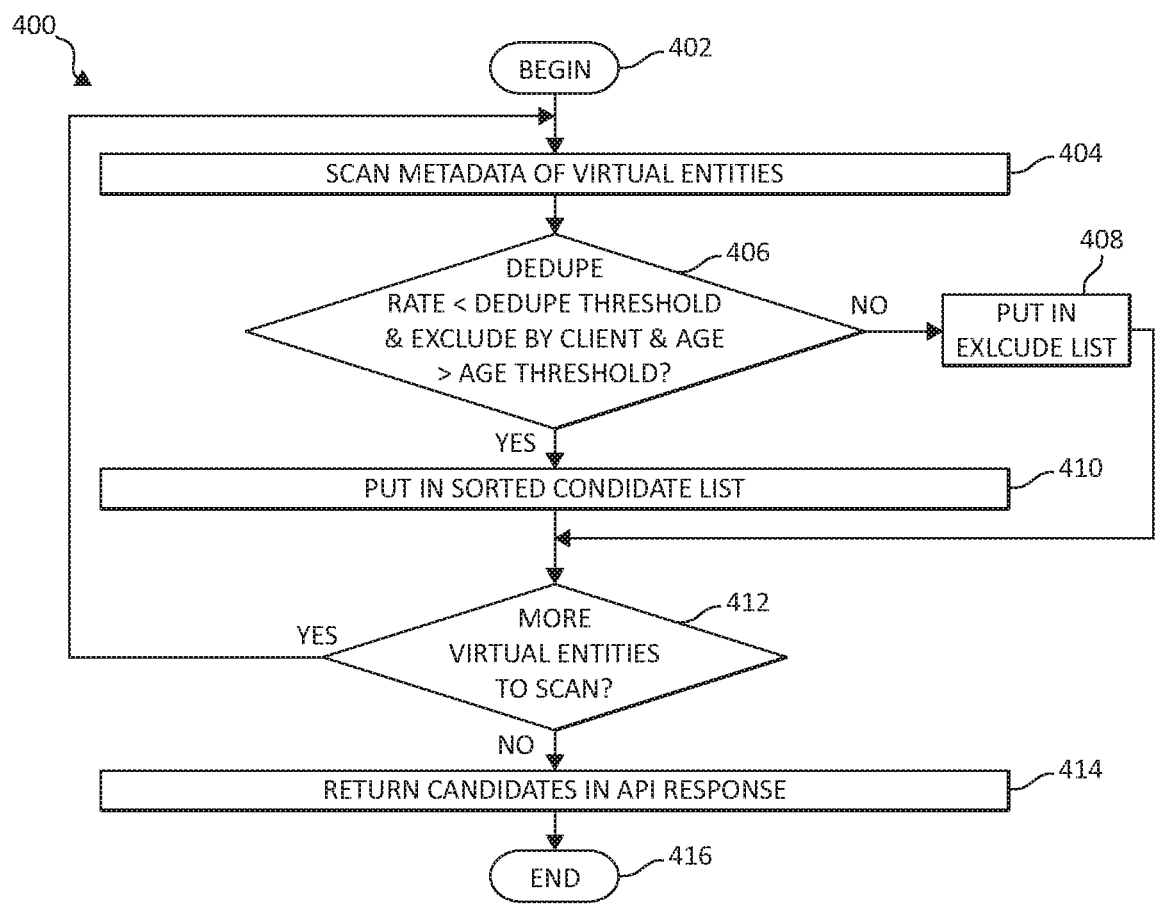
FIG. 4 is an additional flow chart illustrating a method for managing data in a data deduplication repository in accordance with aspects of the present invention.

Advancing to FIG. 4, a method 400 for identifying candidate repository data for offloading to object storage, is illustrated, in accordance with one embodiment of the present invention. The method 400 may be performed in accordance with the present invention in any of the environments depicted in FIGS. 1-2, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Beginning (step 402), metadata of a subset of virtual data entities is scanned in the local repository via initiation of an API command by the backup management application or an end user. The API command may be executed by a graphical user interface (GUI), a command line interface (CLI), or other known interface commonly known in the art. The subset of virtual data entities may be a range of virtual cartridges, all cartridges in a virtual library, all cartridges in the deduplication repository, etc. (step 404). If the deduplication rate (i.e. reference count number) is less than a predetermined reference count threshold which the user has set dictating which repository data to migrate to object storage, the data has not been marked for exclusion from the offload process, and the age of the data is greater than a predetermined age threshold set by the user (step 406), the virtual data entity is listed in a sorted candidate list (step 410). The sorted candidate list is sorted based upon data deduplication ratio and age information.

Returning to step 406, if the deduplication rate provided by the reference count number is greater than the predetermined reference count threshold, the data is marked for "opt-out" exclusion from the offload process, or the age of the data is newer than the predetermined age threshold, the virtual data entity is listed on an exclude list (step 408).

Next, the algorithm checks to see if more virtual data entities exist to be scanned (step 412). If more virtual data entities exist to be scanned, the method 400 returns to scanning the metadata of the next virtual data entities (step 404), until all entities have been scanned. If, at step 412, no additional virtual data entities exist to be scanned, data candidates in sorted order are returned in the API response (step 414), and the method ends (step 416).

Virtual Entity Offload Processing

Figure 5:
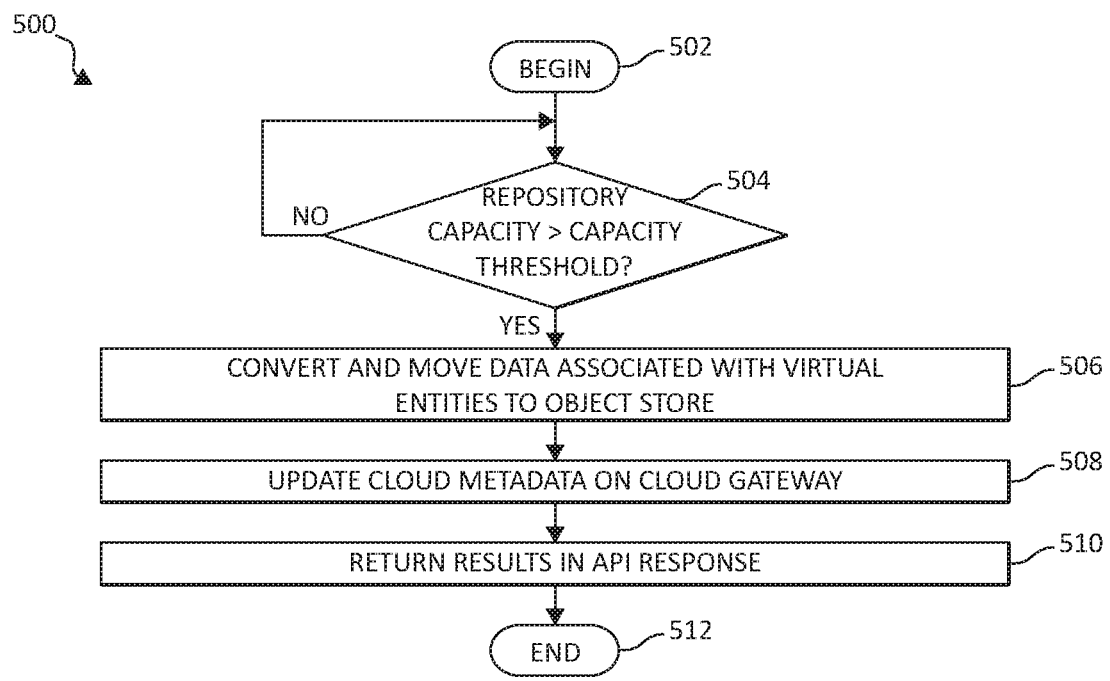
FIG. 5 is still an additional flow chart illustrating a method for managing data in a data deduplication repository in accordance with aspects of the present invention.

FIG. 5 illustrates a method 500 for offload processing data to object storage, in accordance with one embodiment of the present invention. The method 500 may be performed in accordance with the present invention in any of the environments depicted in FIGS. 1-2, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Beginning (step 502), if the host repository capacity is greater than a predetermined repository capacity threshold (step 504), the data associated with the virtual entity is converted and moved to object storage (step 506). This process comprises migrating the metadata and user data associated with the virtual entity and converting it to objects and containers stored in an object store using a representational state transfer (REST) API. If, at step 504, the repository capacity is below the predetermined repository capacity threshold, the method begins anew at step 502, until such time that the predetermined repository capacity threshold is met.

Returning to step 506, once the metadata and user data associated with the virtual data entities are migrated to the object storage, the host deduplicating gateway metadata is updated with record of the virtual data entities placement and mapping to the object store (step 508). The results of the offload process are then returned in an API response to the backup management application or end user (step 510), and the method ends (step 512).

Figure 6:
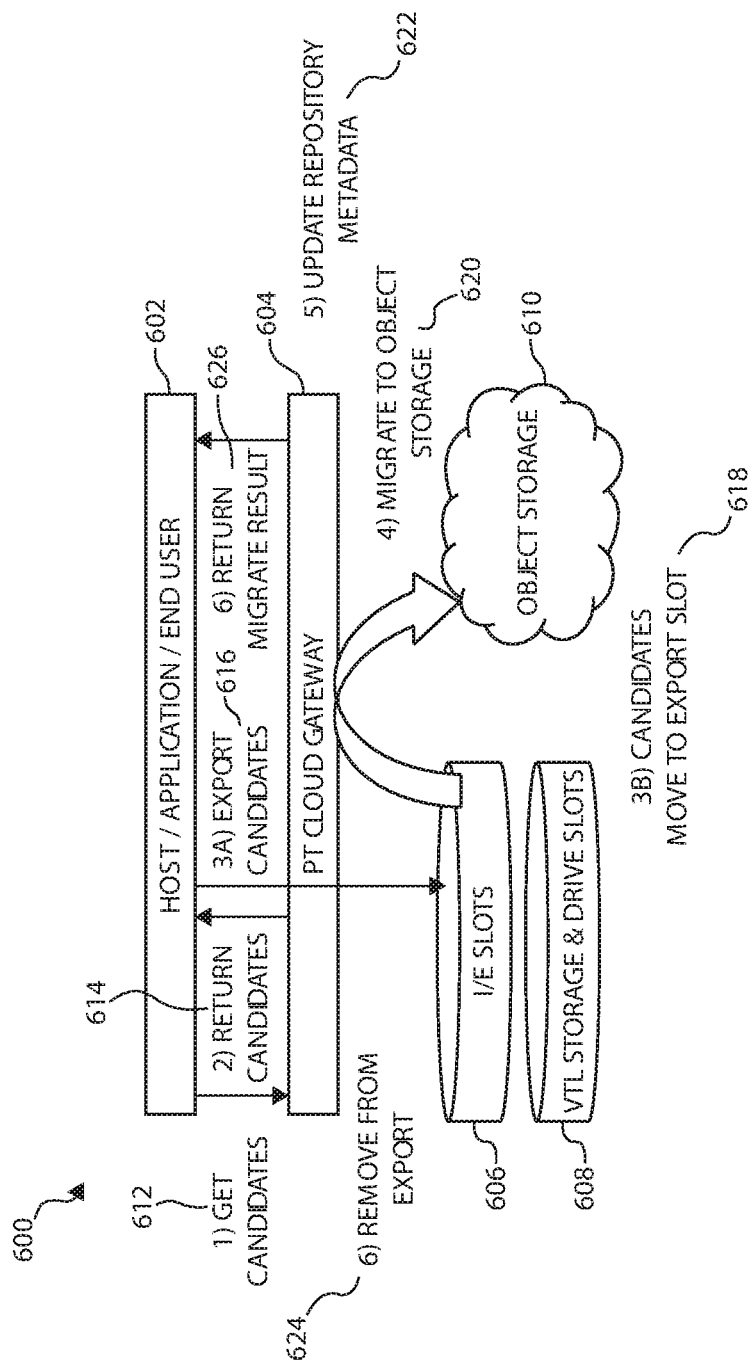
FIG. 6 is a block diagram illustrating a method for offloading repository data in accordance with aspects of the present invention.

In alternate embodiments, the virtual candidate entity identification and virtual entity offload processing methods may be combined into one method shown as alternate method 600, as illustrated in FIG. 6. In other words, an API request may be initiated to identify the data to be offloaded, the offload process may complete, and results may be returned to the host or end user, in one step. FIG. 6 depicts a host/application 602, a deduplicating gateway (e.g. IBM® ProtecTIER™ deduplicating gateway) 604, VTL storage and drive slots 608, import/export (I/E) slots 606, and object storage 610.

Specific function is provided according to the host interface(s) that are interacting with the deduplicating gateway 604. In this example using a VTL interface, the following steps may take place: The host/application/end user 602 issues an API request to the deduplicating gateway 604 to acquire a list of candidate data for offloading to the object storage 610 based upon custom criteria as previously described 612. The deduplicating gateway 604 then executes the algorithm provided in FIG. 4, and returns the candidates 614 in a sorted list to the host/application/end user 602. The application, or end user, then issues an API request to export the candidates 616. In the example provided of a VTL interface, the identified cartridges are moved 618 from the VTL storage and drive slots 608 to the I/E slots 606. Once cartridges are moved 618 to the I/E slots 606, the deduplicating gateway 604 migrates the data 620 to the object storage 610, as described in FIG. 5. The deduplicating gateway 604 repository metadata is updated 622 to include a location and mapping of the migrated data in the object storage 610. The cartridge is then removed from the I/E slots 606, and the migrate status is communicated 626 from the deduplicating gateway 604 to the host/application/end user 602.

Figure 7:
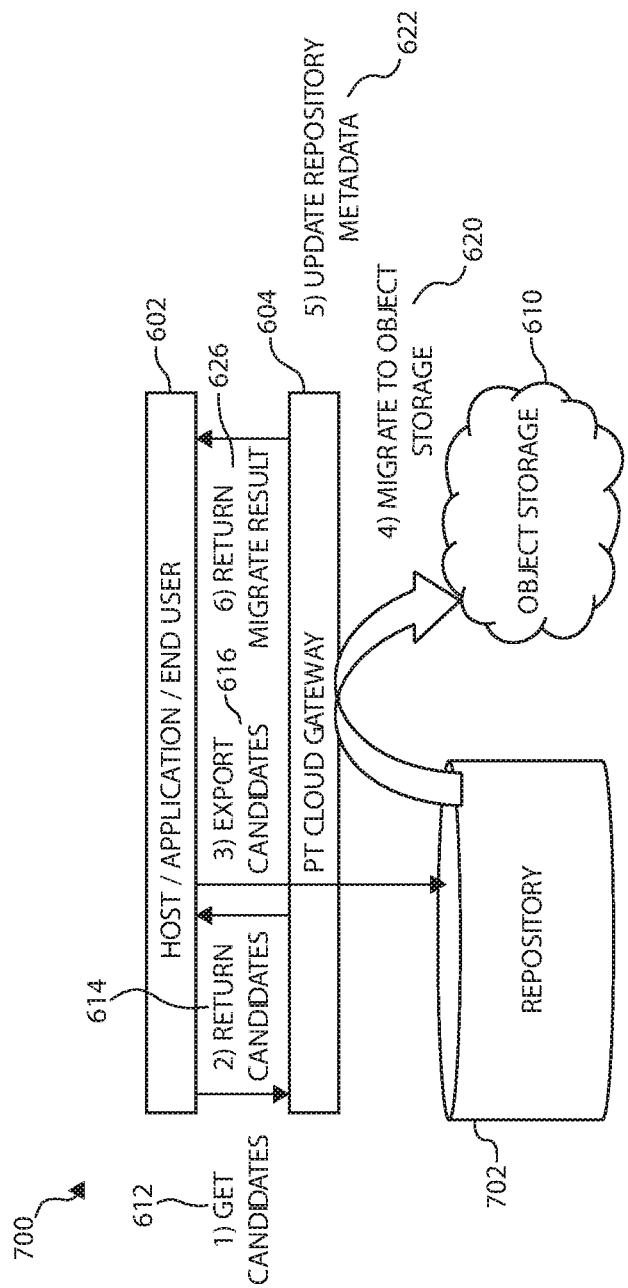
FIG. 7 is an additional block diagram illustrating a method for offloading repository data in accordance with aspects of the present invention.

A similar example is shown in FIG. 7 using an alternate method 700 with a file system interface. Alternate method 700 includes the host/application/end user 602, the deduplicating gateway 604, a repository 702, and the object storage 610. For a file system interface, a mount point is exported that presents the content of the object storage 610 via common internet file system (CIFS)/server message block (SMB) and network file system (NFS) protocols. This requires converting the containers and objects back into the original files when presenting them virtually to the host/application 602. The host/application 602 is then able to use existing functions to import a backup set into the deduplicating gateway 604 by leveraging the virtual mount point presented by the deduplicating gateway 604.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for managing data in a data deduplication repository in a computing storage environment, by a processor device, comprising:
migrating certain deduplication repository data from a host to an object storage by integrating a data offload process with an existing backup management application executing on the host, for reducing unnecessary deduplication repository data stored on the host; wherein the certain deduplication repository data comprises data identified by the existing backup management application as candidate repository data developed on a candidate list; and the candidate repository data on the candidate list includes repository data having a reference count number below a predetermined reference count threshold, the reference count number associated with a deduplication ratio;
issuing a first application programming interface (API) command, by the existing backup management application to a deduplication gateway having input specifying to locate any data within a subset of entities having the reference count number below the predetermined reference count threshold and a data age older than a predetermined age threshold; wherein upon receiving the first API command, the deduplication gateway scans metadata of the subset of entities in a deduplication repository to identify the candidate repository data according to the first API command input, the subset of entities comprising at least one of a range of virtual cartridges, all cartridges in a virtual library, and all cartridges in the deduplication repository; and
responsive to receiving the candidate list by the backup management application, initiating the data offload process by migrating the candidate repository data on the candidate list from the host to the object storage using a second API command by the existing backup management application; wherein, prior to migrating the candidate repository data, upon determining that a repository storing the certain deduplication repository data on the host has exceeded a predetermined repository capacity threshold, user data and metadata associated with virtual entities identified in the subset of virtual entities comprising the candidate repository data is converted, using a representation state transfer (REST) API, into objects and containers comprised of data structures storing the objects subsequently transferred from the host to the object storage upon receipt of the second API command.

2. The method of claim 1, further including excluding repository data from the candidate list based on at least one of the predetermined age threshold and repository data marked as excluded by an end user.

3. The method of claim 1, further including maintaining a mapping of the migrated certain deduplication repository data between the host and the object storage by updating host repository metadata.

4. A system for managing data in a data deduplication repository in a computing storage environment, the system comprising:
at least one processor device, wherein the at least one processor device:
migrates certain deduplication repository data from a host to an object storage by integrating a data offload process with an existing backup management application executing on the host, for reducing unnecessary deduplication repository data stored on the host; wherein the certain deduplication repository data comprises data identified by the existing backup management application as candidate repository data developed on a candidate list; and the candidate repository data on the candidate list includes repository data having a reference count number below a predetermined reference count threshold, the reference count number associated with a deduplication ratio;

issues a first application programming interface (API) command, by the existing backup management application to a deduplication gateway having input specifying to locate any data within a subset of entities having the reference count number below the predetermined reference count threshold and a data age older than a predetermined age threshold; wherein upon receiving the first API command, the deduplication gateway scans metadata of the subset of entities in a deduplication repository to identify the candidate repository data according to the first API command input, the subset of entities comprising at least one of a range of virtual cartridges, all cartridges in a virtual library, and all cartridges in the deduplication repository; and responsive to receiving the candidate list by the backup management application, initiates the data offload process by migrating the candidate repository data on the candidate list from the host to the object storage using a second API command by the existing backup management application; wherein, prior to migrating the candidate repository data, upon determining that a repository storing the certain deduplication repository data on the host has exceeded a predetermined repository capacity threshold, user data and metadata associated with virtual entities identified in the subset of virtual entities comprising the candidate repository data is converted, using a representation state transfer (REST) API, into objects and containers comprised of data structures storing the objects subsequently transferred from the host to the object storage upon receipt of the second API command.

5. The system of claim 4, wherein the at least one processor device excludes repository data from the candidate list based on at least one of the predetermined age threshold and repository data marked as excluded by an end user.

6. The system of claim 4, wherein the at least one processor device maintains a mapping of the migrated certain deduplication repository data between the host and the object storage by updating host repository metadata.

7. A computer program product for managing data in a data deduplication repository in a computing storage environment, by a processor device, the computer program product embodied on a non-transitory computer-readable storage medium having computer-readable program code portions stored therein, the computer-readable program code portions comprising:

an executable portion that migrates certain deduplication repository data from a host to an object storage by integrating a data offload process with an existing backup management application executing on the host, for reducing unnecessary deduplication repository data stored on the host; wherein the certain deduplication repository data comprises data identified by the existing backup management application as candidate repository data developed on a candidate list; and the candidate repository data on the candidate list includes repository data having a reference count number below a predetermined reference count threshold, the reference count number associated with a deduplication ratio; and an executable portion that issues a first application programming interface (API) command, by the existing backup management application to a deduplication gateway having input specifying to locate any data within a subset of entities having the reference count number below the predetermined reference count threshold and a data age older than a predetermined age threshold; wherein upon receiving the first API command, the deduplication gateway scans metadata of the subset of entities in a deduplication repository to identify the candidate repository data according to the first API command input, the subset of entities comprising at least one of a range of virtual cartridges, all cartridges in a virtual library, and all cartridges in the deduplication repository; and an executable portion that, responsive to receiving the candidate list by the backup management application, initiates the data offload process by migrating the candidate repository data on the candidate list from the host to the object storage using a second API command by the existing backup management application; wherein, prior to migrating the candidate repository data, upon determining that a repository storing the certain deduplication repository data on the host has exceeded a predetermined repository capacity threshold, user data and metadata associated with virtual entities identified in the subset of virtual entities comprising the candidate repository data is converted, using a representation state transfer (REST) API, into objects and containers comprised of data structures storing the objects subsequently transferred from the host to the object storage upon receipt of the second API command.

8. The computer program product of claim 7, further including an executable portion that excludes repository data from the candidate list based on at least one of the predetermined age threshold and repository data marked as excluded by an end user.

9. The computer program product of claim 7, further including an executable portion that maintains a mapping of the migrated certain deduplication repository data between the host and the object storage by updating host repository metadata.

* * * * *